United States Patent [19]

Shigematsu et al.

[11] 4,241,240
[45] Dec. 23, 1980

[54] OPTICAL INFORMATION RECORDING APPARATUS

[75] Inventors: Kazuo Shigematsu, Kawasaki; Keizo Kato; Toshimitsu Miyauchi, both of Hachioji; Seiji Yonezawa, Hachioji; Fumiyuki Inose, Kokubunji; Kimio Tatsuno, Kokubunji; Takeshi Maeda, Kokubunji, all of Japan

[73] Assignee: Hitachi, Ltd., Japan

[21] Appl. No.: 954,869

[22] Filed: Oct. 26, 1978

[30] Foreign Application Priority Data

Nov. 4, 1977 [JP] Japan .................... 52-131564

[51] Int. Cl.³ .................... H04N 5/76; G11B 7/12
[52] U.S. Cl. .................... 179/100.1 G; 358/128.5; 360/72.2; 346/76 L
[58] Field of Search ............. 360/77, 72, 72.2; 346/76 L; 179/100.3 V, 100.3 N, 100.3 P, 100.1 G, 100.4 D; 358/128, 128.5; 365/215; 250/202, 203

[56] References Cited

U.S. PATENT DOCUMENTS

| 3,657,707 | 4/1972 | McFarland | 346/76 L |
| 3,715,740 | 2/1973 | Schmidt | 360/59 |
| 4,094,010 | 6/1978 | Pepperl | 360/77 |
| 4,094,013 | 6/1978 | Hill | 360/77 |
| 4,142,209 | 2/1979 | Hedlund | 360/77 |

Primary Examiner—Raymond F. Cardillo, Jr.
Assistant Examiner—Alan Faber
Attorney, Agent, or Firm—Craig and Antonelli

[57] ABSTRACT

An optical information recording and reproducing apparatus is disclosed in which a predetermined signal is recorded on a track of a rotating recording medium by a recording light beam and the recorded information is reproduced by a reproducing light beam. The information recorded on the last record track is reproduced by the recording beam and the reproducing beam and radiating position of the recording beam on the recording medium is displaced by a predetermined distance from the last record track.

1 Claim, 2 Drawing Figures

OPTICAL INFORMATION RECORDING APPARATUS

BACKGROUND OF THE INVENTION

The present invention relates to an optical information recording apparatus, and more particularly to an apparatus for recording information on optical recording medium such as optical video disk or optical audio disk.

DESCRIPTION OF THE PRIOR ART

Heretofore, it has been the practice to optically record and reproduce information on and from a thin film (disk) of e.g. amorphous chalcogenide such as Te or metal such as Bi.

A prior art apparatus for optically recording and reproducing information is shown in FIG. 1, in which a gas laser is used as a light source. In FIG. 1, reference numeral 101 denotes an Ar laser light source for recording information, 102 denotes a He-Ne laser light source for reproducing information, 103 denotes an optical modulator, and 104 denotes a driver for driving the optical modulator 103. The driver 104 receives information by which a light beam from the laser light source 101 is modulated. Numeral 105 denotes a lens, 106 denotes a beam splitter, 107 denotes an objective lens, 108 denotes a disk, 110 denotes a lens, 111 denotes a beam splitter, 112 denotes an optical deflector and 113 denotes an optical detector. In this arrangement, the light beam from the light source 101 is modulated by the modulator 103 and a modulated beam reaches the disk 108 through the beam splitter 106 and the objective lens 107 so that information is recorded on the disk 108. The information recorded on the disk 108 is read out by tracking the information by the light beam from the light source 102, which has been deflected by the deflector 112. The reading is carried out in such a manner that the light beam from the light source 102 is reflected by the disk 108 and the reflected beam is directed to the optical detector 113.

In recording information on such an optical disk, it has been practised to provide a reference track on the disk for positioning a recording site and information is recorded with reference to the reference track so that information is recorded precisely on the disk. By virtue of this reference track, it is possible to record information while precisely keeping a predetermined distance between a previously recorded track and a track being recorded. However, the provision of the reference track results in the reduction of a recording density of the disk. Furthermore, where add-on recording is carried out rather than continuous recording, that is, where recording is made in such a manner that a disk is unloaded after information has been recorded on several tracks of the disk and the disk is again loaded to additionally record information, it is disadvantageous to use the reference track, because a long period of time is required to record the additional information since the reference track should be first detected and then a recording site on the disk at which add-on recording is to be made should be detected.

Furthermore, when the add-on recording is not carried out exactly, the following inconvenience is encountered. That is, the disk usually has the amount of eccentricity of 40–50 μm and a track pitch of approximately 2 μm. Therefore, when the add-on recording is made, the newly recorded track may cross certain number of previously recorded tracks and hence precise recording cannot be attained.

SUMMARY OF THE INVENTION

It is an object of the present invention to provide an optical information recording apparatus which enables add-on recording of information while keeping an exact intertrack distance on a disk and eliminating an influence by the eccentricity of the disk.

In order to achieve the above object, the present invention is characterized by the fact that a recording light beam and a reproducing light beam are arranged such that they are displaced from each other on an optical disk by a predetermined number of tracks so that the recording light beam records information on a desired track while the reproducing light beam is tracking a previously recorded track.

DESCRIPTION OF THE PREFERRED EMBODIMENTS

Figure 1:
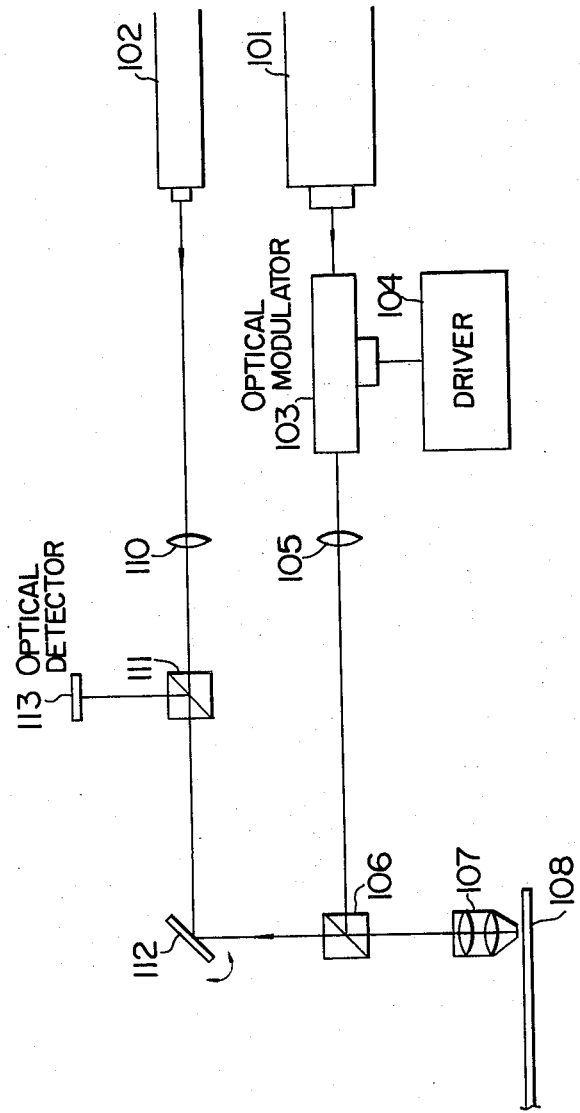
FIG. 1 shows a schematic diagram of a prior art optical information recording and reproducing apparatus.
Figure 2:
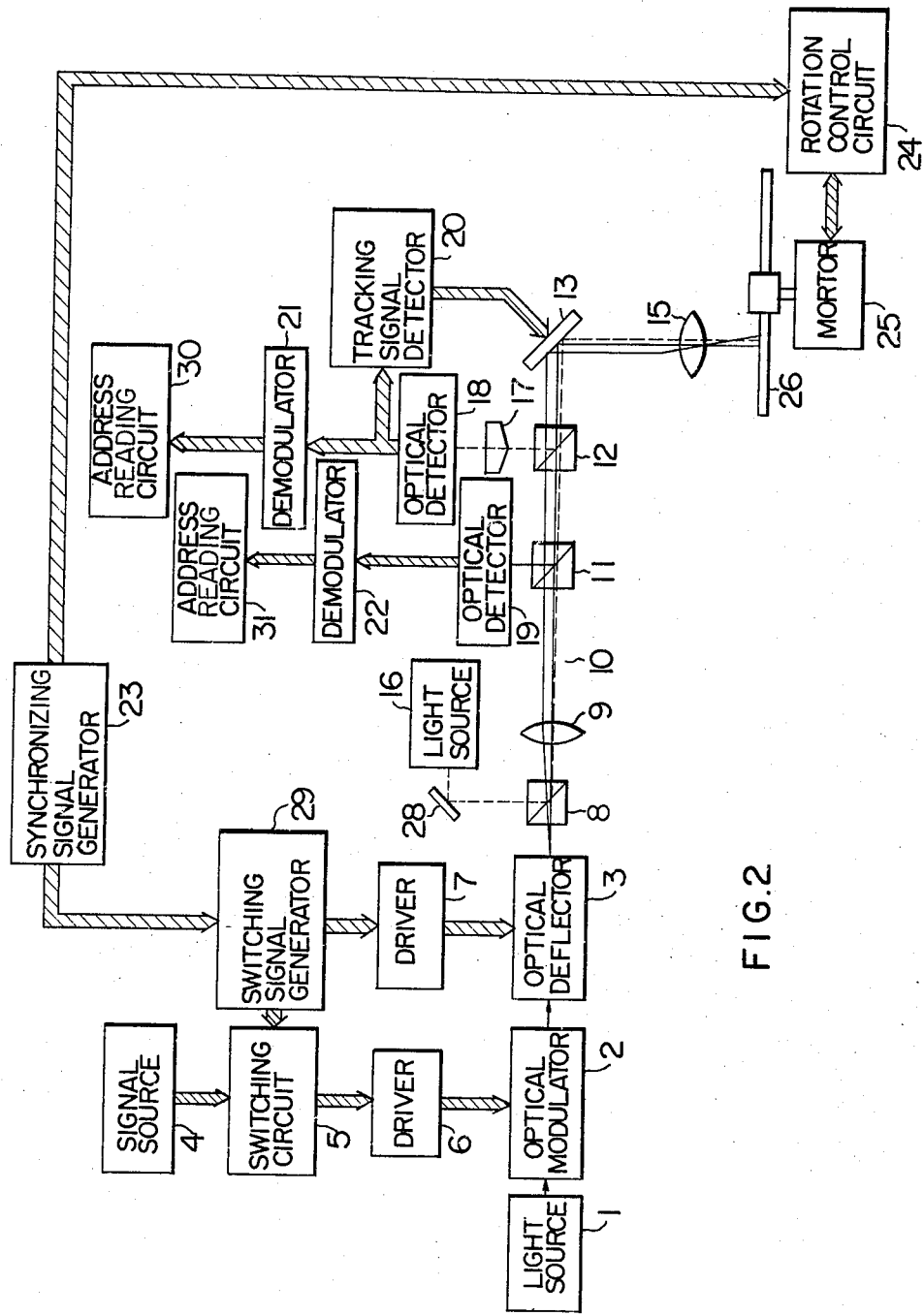
FIG. 2 shows a schematic diagram of one embodiment of the present invention.

FIG. 2 shows an embodiment of the present invention. In FIG. 2, the beam emitted from a recording light source 1 passes through an optical modulator 2 and an optical deflector 3 into a focusing optical system 10. The recording light source 1 may be an $Ar^{30}$ laser and the optical modulator 2 may be an electro-optical (E/O) modulator or an acoustic-optical (A/O) modulator, which modulates the recording beam in accordance with a record signal from a signal source 4. The optical deflector 3 functions to establish a predetermined distance on a disk between the recording beam and a reproducing beam, as will be explained later, and it may be an A/O deflector. The recording beam from the optical deflector 3 is focused onto the disk 26 by the focusing optical system 10, which may comprise a lens 9, an optical deflector 13 and an objective lens 15. On the other hand, the reproducing beam emitted from a reproducing light source 16 is directed to the focusing optical system 10 by a half-prism 8 and focused onto the disk 26 in a similar manner to the recording beam. The reproducing light source 16 may be a He-Ne laser. The reflected reproducing beam from the disk 26 is directed to an optical detector by a half-prism 12, and an output from the optical deflector 18 is applied to a tracking signal detector 20. A detected tracking signal from the detector 20 is supplied to an optical deflector 13 such as a Galvano mirror to track a recorded track on the disk 26. The output from the optical detector 18 is also supplied to a demodulator 21 to demodulate the signal on the tracking track. From the demodulated signal, an address reading circuit 30 detects a signal number of the demodulated signal, that is, an address which has been recorded as information on the track. On the other hand, a reflected recording beam from the disk 26 is directed to an optical detector 19 by a half-prism 11. The disk 26 is rotated by a motor 25.

In the arrangement described above, the add-on recording is carried out in the following manner. Initially, information on the previously recorded tracks is reproduced by the reproducing beam to locate the most recently recorded track (last track) among the previously recorded tracks. This is effected by detecting the addresses recorded on the tracks. Then, a switching circuit 5 is enabled by a signal from a switching signal generator 29 to actuate a driver 6 which in turn drives the optical modulator 2 in such a manner that it provides a zero-modulation to the recording beam. This may be effected by providing a D.C. voltage from the driver 6 to the modulator 2. The term "zero-modulation" to the recording beam herein used means that a beam output is so reduced that the beam does not have a sufficient power for recording.

The zero-modulation recording beam is relected on the disk 26 and the reflected beam in directed to the optical detector 19 by the half-prism 11 and the detected output is demodulated by a demodulator 22. An address reading circuit 31 detects a track address from the demodulator 22.

The next step is to make the track address read out by the zero-modulation recording beam and the address read out by the reproducing beam to coincide with each other. Such a coincidence may be attained by displacing the recording beam by the optical deflector 3, or by displacing the reproducing light source 16, or by adjusting an angle of a reflecting mirror 28 disposed between the light source 16 and the half-prism 8. After the coincidence of the track addresses for the reproducing beam and the recording beam has been identified, a driver 7 is actuated by a switching signal from the switching signal generator 29, to drive the optical deflector 3 so as to displace the recording beam by a predetermined track distance (e.g. 2 μm) on the disk 26. A deflection angle θ of the optical deflector 3 necessary to displace the recording beam by a distance l on the disk 26 is given by;

$$\theta = \tan^{-1}(l\beta/L)$$

where β is a magnification factor of the objective lens 15, and L is a focal distance of the lens 9.

When an A/O deflector is used as the optical deflector 3, the frequency of the drive signal to be supplied from the driver 7 to the optical deflector 3 may be controlled to attain the deflection angle θ.

The switching signal from the switching signal generator 29 also actuates the switching circuit 5 in addition to the driver 7 so that a record signal from a signal source 4 is supplied to the driver 6 and the recording beam is modulated with the record signal in the optical modulator 2. In this manner, the information is recorded on a new track while the predetermined distance l between the recording beam and the reproducing beam on the disk is being maintained, that is, while the predetermined distance l from the previously recorded track is being maintained. For example, when a video signal is to be recorded, a synchronizing signal generator 23 causes the switching signal generator 29 to generate switching signals for one frame or 1/30 seconds, and the switching circuit 5 applies one frame of video signal to the optical modulator 2 so that only one frame of signal is recorded. Since the motor 25 for rotating the disk 26 is rotated at 30 Hz in synchronism with the synchronizing signal from the synchronizing signal generator 23, the one frame of video signal is recorded on one of the concentric tracks.

By repeating the above steps, the information can be recorded on sequential tracks while maintaining the predetermined intertrack distance.

While the reproducing light source is separately provided in the illustrated embodiment, the separate reproducing light source may be omitted and instead a portion of the recording beam may be extracted between the optical modulator 2 and the recording lihgt source 1 to use it as the reproducing beam.

We claim:

1. An optical information recording apparatus comprising:
   a first light source for emitting a recording beam;
   a second light source for emitting a reproducing beam;
   a recording medium having predetermined information recorded thereon;
   an optical system for directing said beams from said first and second light sources to said recording medium, said optical system being disposed between said first and second light sources and said recording medium;
   first reproducing means for reproducing information on said recording medium by said reproducing beam emitted from said second light source;
   means for zero-modulating said recording means emitted from said first light source;
   second reproducing means for reproducing information on said recording medium by said zero-modulation beam;
   first detecting means for detecting an address of said information reproduced by said first reproducing means;
   second detecting means for detecting an address of said information reproduced by said second reproducing means;
   means for making the addresses detected by said first and second detecting means to coincide with each other; and
   means for displacing said zero-modulation beam by a predetermined distance from the location of said reproduced information on said recording medium;
   whereby information carried on the beam emitted from said first light source is recorded on an adjacent track as the beam emitted from said second light source tracks the recorded information.

* * * * *